United States Patent [19]
Matsuda

[11] Patent Number: 5,282,674
[45] Date of Patent: Feb. 1, 1994

[54] FRONT/REAR APPORTIONING CONTROL BASED ON VEHICLE TURNING

[75] Inventor: Toshiro Matsuda, Kanagawa, Japan

[73] Assignee: Nissan Motor Co., Ltd., Yokohama, Japan

[21] Appl. No.: 802,295

[22] Filed: Dec. 4, 1991

[30] Foreign Application Priority Data

Dec. 21, 1990 [JP] Japan .................. 2-412734

[51] Int. Cl.⁵ .............................. B60T 8/26
[52] U.S. Cl. ..................... 303/9.71; 303/103; 303/113.5
[58] Field of Search ............ 303/9.62, 100, 104, 303/105, 108, 113 AP, 115 EC, 116 PC, 119 SV, DIG. 1-4, 113.5, 115.2, 116.4, 119.2, 9.71; 188/349, 97, 103

[56] References Cited

U.S. PATENT DOCUMENTS

| 4,664,452 | 5/1987 | Kubota et al. | 303/DIG. 3 X |
| 4,836,618 | 6/1989 | Wakata et al. | 303/93 X |
| 4,902,076 | 2/1990 | Ushijima et al. | 303/100 |

FOREIGN PATENT DOCUMENTS

61-238554 10/1986 Japan.
0282156 12/1986 Japan .................. 303/9.62

Primary Examiner—Robert J. Oberleitner
Assistant Examiner—Josie A. Ballato
Attorney, Agent, or Firm—Foley & Lardner

[57] ABSTRACT

A control system for distributing braking forces applied to a front wheel and a rear wheel in an automotive vehicle, comprises a fluid pressure control valve normally controlling a brake fluid pressure distribution between front and rear wheels such that a rear-wheel brake fluid pressure is less than a front-wheel brake fluid pressure in a range exceeding a critical fluid pressure across which the brake fluid pressure distribution between the front and rear wheels is essentially varied, a lateral acceleration sensor for monitoring a degree of turn of the vehicle, and a set of reversible motor and return spring for varying the critical fluid pressure in dependence on the degree of turn of the vehicle such that the critical fluid pressure is set at a higher level than a given reference critical fluid pressure which reference fluid pressure is set in the fluid pressure control valve in a straight-ahead driving state of the vehicle.

8 Claims, 4 Drawing Sheets

FRONT/REAR APPORTIONING CONTROL BASED ON VEHICLE TURNING

BACKGROUND OF THE INVENTION

1. Field of the Invention

The present invention relates to a control system for distributing braking forces applied to front and rear vehicle wheels so as to prevent the vehicle from moving along an unacceptable turning locus, when the vehicle is turned to the right or the left.

2. Description of the Background Art

As is generally known, hydraulic type brake systems use the pressure of a working fluid (brake fluid) to force the brake shoes against the brake drums or disk. In such traditional hydraulic brake systems brake fluid pressure is forced through a master cylinder to each wheel-cylinder in proportion to a depressing force exerted on a brake pedal and as a result each vehicle wheel is braked. During braking, more of the car weight is transferred to the front wheels and thus the car weight becomes less at the rear wheels. If normal braking were continued with the front-wheel brake fluid pressure equal to the rear-wheel brake fluid pressure, the brakes could first lock the rear wheels so that the rear tires skid. As a result, the rear wheels could throw the entire car into a rear-end skid. This could result in oversteer and/or spinning on wet or icy roads. As is well known, it is advantageous to provide a braking action according to which front wheel lock gets priority over rear wheel lock so as to prevent oversteer tendencies on turns. As indicated by a broken line of FIG. 6, it is desired that both front and rear wheel brake fluid pressures are varied in accordance with an ideal brake fluid pressure distribution characteristic curve wherein both front and rear wheels are locked simultaneously so as to provide an optimal braking efficiency.

Figure 6:
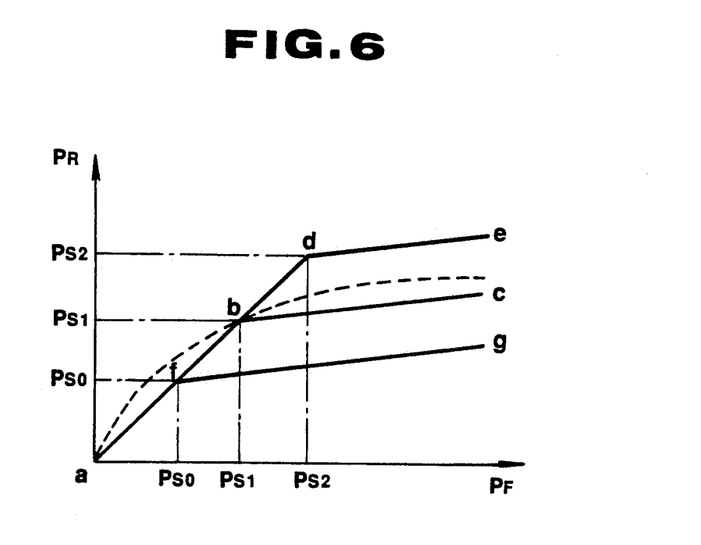
FIG. 6 shows graphs illustrating pressure distribution characteristics of fluid pressures in front and rear wheel-cylinders activated by the brake control system according to the invention.

In view of the above, as shown by a solid line corresponding to a brake fluid pressure characteristic curve a-b-c in FIG. 6, a conventional hydraulic brake system employs a brake fluid control valve through which the rear-wheel brake fluid pressure $P_R$ is set to a lower level over a wide range across a preset point b (a preset brake fluid pressure $P_{S1}$) of the ideal brake fluid pressure distribution characteristic curve indicated by the above noted broken line. The point b corresponds to a particular point across which a brake fluid pressure distribution between front and rear wheels is essentially varied. As appreciated from the brake fluid pressure characteristic curve a-b-c in FIG. 6, the conventional fluid pressure control valve controls the brake fluid pressure distribution between front and rear wheels such that the rear-wheel brake fluid pressure $P_R$ is set essentially at the same value as the front-wheel brake fluid pressure $P_F$ in a relatively low fluid pressure range from a to b and held substantially constant at a lower level than the front-wheel brake fluid pressure in a relatively high fluid pressure range from b to c. As seen in FIG. 6, the brake fluid pressure distribution between the front and rear brake fluid pressures $P_F$ and $P_R$ is varied across the split point $P_{S1}$ with a predetermined ratio of line bc to line afb. The point b is in general referred to as a "split point". A fluid pressure $P_{S1}$ corresponding to the split point b is referred to as a "critical brake fluid pressure". As shown in FIG. 6, in a relatively high fluid pressure range exceeding the split point b, the rear-wheel brake fluid pressure $P_R$ is set at a lower pressure than the front-wheel brake fluid pressure $P_F$, so as to avoid vehicle spin during braking on hard turns. In other words, the brake fluid pressures in the front and rear wheel-cylinders are set such that the front wheel lock gets priority over the rear wheel lock to avoid oversteer tendencies of the vehicle during braking on turns.

However, in such a conventional hydraulic brake system achieving braking control according to the brake fluid pressure characteristic curve a-b-c, if the brakes are moderately applied to vehicle wheels when the vehicle turns with a relatively large lateral acceleration exerted on the vehicle body, the car weight is shifted to the front wheels. Since neither front nor rear wheels reach a locking condition due to such moderate braking action, cornering force created at the front wheels is increased, whereas cornering force created at the rear wheels is decreased, thereby resulting in oversteer during moderate braking operations on hard turns. On the other hand, in the conventional hydraulic brake system having the brake fluid pressure characteristics a-b-c, if the brakes are quickly applied to vehicle wheels during hard turn, the vehicle may experience front-end skid because the front wheels are first locked due to the front-wheel brake fluid pressure $P_F$ being set to a higher level than the rear-wheel brake fluid pressure $P_R$. There is then a tendency for understeer to occur during hard braking on a severe turn.

SUMMARY OF THE INVENTION

It is, therefore, in view of the above disadvantages, an object of the present invention to provide a brake control system for an automotive vehicle which can reduce understeer of the vehicle even if brakes are quickly applied to vehicle wheels and relatively high brake fluid pressures develop on turns.

It is another object of the invention to provide a brake control system for an automotive vehicle which can provide optimal distribution of braking forces between front and rear wheels in response to the degree of turn of the vehicle.

It is a further object of the invention to provide a brake control system for an automotive vehicle which can avoid oversteer even if brakes are moderately applied to vehicle wheels and relatively low brake fluid pressures develop on turns.

It is a still further object of the invention to provide an optimal distribution of braking forces between front and rear wheels irrespective of various braking conditions, namely a moderate braking and a quick braking.

It is another object of the invention to provide a brake control system for an automotive vehicle which can provide an optimal brake fluid pressure distribution between front and rear wheel-cylinders in dependence on a deceleration of the vehicle.

In order to accomplish the aforementioned and other objects, a control system for distributing braking forces applied to a front wheel and a rear wheel in an automotive vehicle, comprises a fluid pressure control valve for normally controlling a brake fluid pressure distribution between front and rear wheels such that a rear-wheel brake fluid pressure is less than a front-wheel brake fluid pressure in a range above a critical fluid pressure at which the brake fluid pressure distribution between the front and rear wheels is essentially varied, means for monitoring whether the vehicle turns, to generate a signal representative of a turning state of the vehicle, and means for varying the critical fluid pressure in response to the signal representative of the turning state of the vehicle such that the critical fluid pressure is set at a higher level than a given reference critical fluid pressure which reference fluid pressure is set in the fluid pressure control valve in a straight-ahead driving state of the vehicle.

The turning state monitoring means includes means for detecting a degree of turn of the vehicle, the critical fluid pressure varying means varies the critical fluid pressure in dependence on the degree of turn detected by the detecting means. The detecting means for the degree of turn may include a lateral acceleration sensor for monitoring a lateral acceleration of the vehicle body to generate a signal representative of the lateral acceleration, the detecting means determining the degree of turn on the basis of the signal from the lateral acceleration sensor. The critical fluid pressure varying means may vary the critical fluid pressure linearly such that the critical fluid pressure rises up in proportion to the degree of turn.

The above noted control system further comprises means for deriving a magnitude of braking force of the vehicle to generate a signal representative of the magnitude of braking force. The critical fluid pressure varying means may also vary the critical fluid pressure in response to the signal representative of the magnitude of braking force in such a manner as to set the critical fluid pressure at a lower level than the reference critical fluid pressure when the magnitude of braking force is less than or equal to a predetermined value. The critical fluid pressure varying means may vary the critical fluid pressure linearly in proportion to the magnitude of braking force such that the critical fluid pressure is set at a lower level than the reference critical fluid pressure when the magnitude of braking force is less than or equal to the predetermined value and set at a higher level than the reference critical fluid pressure when the magnitude of braking force exceeds the predetermined value. The means for deriving the magnitude of braking force may include a longitudinal acceleration sensor for monitoring a longitudinal acceleration of the vehicle body to generate a signal representative of the longitudinal acceleration, the deriving means determining the magnitude of braking force on the basis of the signal from the longitudinal acceleration sensor.

DESCRIPTION OF THE PREFERRED EMBODIMENTS

Figure 1:
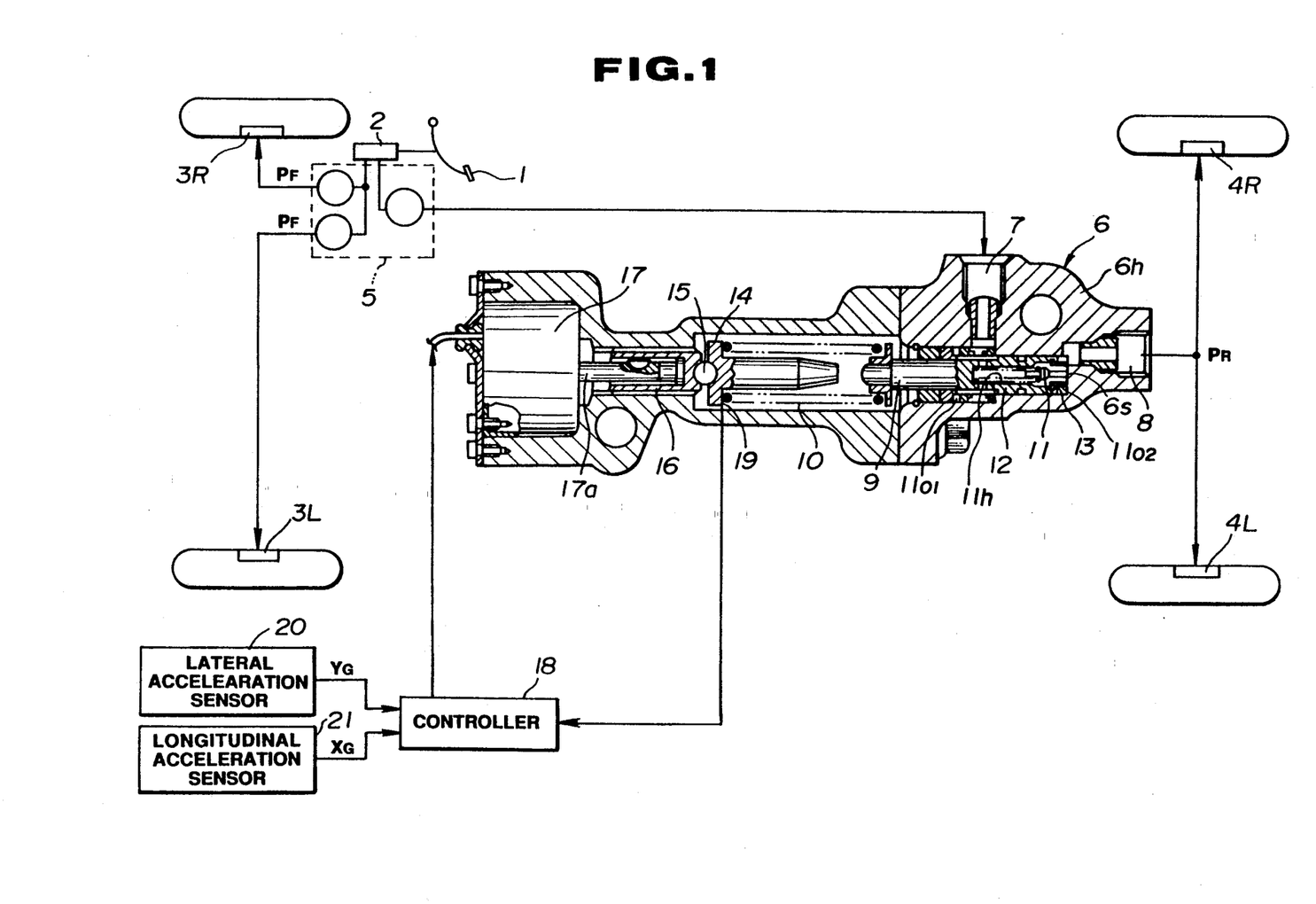
FIG. 1 is a schematic piping arrangement illustrating a preferred embodiment of an automotive brake control system for distributing braking forces applied to vehicle wheels.

Referring now to the drawings, particularly to FIG. 1, a brake control system according to the present invention comprises a tandem master cylinder 2 with two pistons (not shown) set in tandem and front-left, front-rear, rear-left and rear-right wheel-cylinders 3L, 3R, 4L and 4R. The master cylinder 2 generates fluid pressure proportional to a depressing force applied on a brake pedal 1. A master-cylinder fluid pressure forced by a first piston in the cylinder 2 is supplied through a first outlet of the cylinder 2 to both front wheel-cylinders 3L and 3R as a brake fluid pressure $P_F$ for front wheel-cylinders, while the other master-cylinder fluid pressure forced by a second piston of the cylinder 2 is supplied through a second outlet of the cylinder 2 and fluid pressure control valves 6 (as described in detail herebelow) to both rear wheel-cylinders 4L and 4R as a brake fluid pressure $P_R$ in rear wheel-cylinders. Recently, a well-known 3-channel anti-skid brake control unit 5 is often provided to control the brake fluid pressures $P_F$ in the front wheel-cylinders 3L and 3R independently of each other and the brake fluid pressures $P_R$ in the rear wheel-cylinders 4L and 4R commonly, so as to prevent a wheel lock.

In a rear-wheel brake fluid system, the brake control system of the present invention also includes a brake fluid pressure control valve 6 acting as a well-known proportioning valve as disclosed in Japanese First Publication Tokkai (Showa) 61-238554. The fluid pressure control valve 6 receives the fluid pressure from the second outlet of the cylinder 2 through an inlet port 7 and outputs an adjusted fluid pressure serving as the brake fluid pressure $P_R$ through an outlet port 8 to the rear wheel-cylinders 4L and 4R. Although it is not clearly shown, the fluid pressure control valve 6 includes a substantially cylindrical stepped plunger 9 slidably disposed in a cylindrical hollow defined in its valve housing 6h, a return spring 10 biasing the plunger 9 towards a rightmost position (viewing FIG. 1) wherein a poppet valve seat 13 attached to the right end of the plunger mates with a shoulder 6s of the housing 6h, a poppet valve 11 slidably enclosed in a cylindrical hollow 11h bored in the plunger 9, and a return spring 12 operably enclosed in the hollow 11h for biasing the poppet valve 11 rightwards. The plunger also includes a first opening 11o1 formed in the small diameter section and a second opening 11o2 formed in the valve seat 13. As seen in FIG. 1, the inlet port 7 is communicated through the first opening 11o1, the hollow 11h and the second opening 11o2 with the outlet port 8.

In the rightmost position of the plunger 9 as shown in FIG. 1, the right end of the poppet valve 11 is pushed back by the shoulder 6s and therefore the poppet valve is slightly moved in a left direction while compressing the return spring 12. As a result, the poppet valve separates from the valve seat 13 and thus the poppet valve is maintained in the open position. Under this condition, the two ports 7 and 8 are communicated to each other and thus the brake fluid pressure $P_R$ in the rear wheel-cylinders 4L and 4R becomes equal to the master-cylinder fluid pressure (corresponding to the brake fluid pressure $P_F$ in the front wheel-cylinders) fed through the second outlet of the cylinder 2. The above noted state of the fluid pressure control valve 6 occurs in a relatively low pressure range wherein the master-cylinder fluid pressure does not reach a critical brake fluid pressure $P_{S1}$ (determined by a set spring force of the return spring 10) as seen in FIG. 6. In this state, a brake fluid pressure distribution between the front and rear wheel-cylinders is varied in accordance with the fluid pressure characteristic curve a-b of FIG. 6, while keeping the pressure relationship of $P_F = P_R$.

The plunger 9 moves against the return spring 10 in the left direction in accordance with an increase in the master-cylinder fluid pressure. On the other hand, the poppet valve 11 mates with the valve seat 13 by means of the return spring 12 when the master-cylinder fluid pressure is gradually increased and reaches the critical fluid pressure $P_{S1}$. Thus, the poppet valve 11 becomes closed. In the poppet-valve closed state, the poppet valve blocks a communication between the inlet port 7 and the outlet port 8. Therefore, a rate of the brake fluid pressure-rise in the rear wheel-cylinders 4L and 4R does not become equivalent to that of the master-cylinder fluid pressure-rise, but become restricted at a lower level than the rate of the master-cylinder fluid pressure-rise. Under the poppet valve closed state, when the master-cylinder fluid pressure is subsequently increased at a higher level than the critical fluid pressure $P_{S1}$, the subsequent pressure-rise varies a balance between two forces, one being a force pushing the plunger 9 in the left direction (viewing FIG. 1), caused by the rear wheel-cylinder brake fluid pressure $P_R$ applied to the rightmost end of the plunger 9 and the other being a force pushing the plunger 9 in the right direction, caused by the master-cylinder fluid pressure $P_F$ applied to the stepped section of the plunger. For this reason, when the subsequent master-cylinder fluid pressure-rise reaches a given degree of the pressure-rise, the previously noted force balance is destroyed and as a result the plunger 9 moves rightwards. Thus, the poppet valve returns in the open state and the rear wheel-cylinder brake fluid pressure $P_R$ is increased again. Thereafter, the plunger 9 is moved leftwards due to the increased fluid pressure $P_R$ and as a result the poppet valve 11 becomes kept in the closed state. In this manner, when the master-cylinder fluid pressure reaches the critical fluid pressure $P_{S1}$ and subsequently increased, the brake fluid pressure $P_R$ is increased at a lower rate than the rate of the master-cylinder fluid pressure-rise, while alternatively repeating, the opening and closed states of the poppet valve 11. In such a pressure range when the master-cylinder fluid pressure exceeds the critical fluid pressure $P_{S1}$ or the split point b, the brake fluid pressure distribution is varied in accordance with the fluid pressure characteristic curve b-c of FIG. 6. That is, the pressure-rise rate of the rear wheel-cylinder brake fluid pressure $P_R$ is restricted in comparison with the master-cylinder fluid pressure (the front brake fluid pressure $P_F$). As seen in FIG. 1, the fluid pressure control valve 6 exhibits the fluid pressure control characteristics (as seen in the solid line a-b-c of FIG. 6) substantially asymptotic to the ideal brake fluid pressure distribution characteristic curve indicated by the broken line.

The fluid pressure control valve employed in the brake control system according to the invention is different from the conventional fluid flow control valve disclosed in the Japanese First Publication Tokkai (Showa) 61-238554, in that a set spring force of the return spring 10 is variable and consequently the critical fluid pressure $P_{S1}$ (the split point b) is variable. For this reason, the fluid pressure control valve utilized in the improved brake control system of the present invention, includes means for changing a critical fluid pressure (a split point of a brake fluid pressure distribution characteristic curve). The split point changing means comprises an axially movable valve seat 14 supporting one end of the return spring 10, faced apart from the left end of the plunger 9, an axially movable screw 16 being contact with the valve seat 14 through a ball 15, and a reversible motor or rotary solenoid 17 having a driving connection with the screw 16 through its output shaft 17a so as to achieve an axial movement of the screw 16. Both an amount and a direction required for driving the screw 16 are controlled by a controller 18 described hereinbelow in detail. The controller 18 receives various signals generated from a set force sensor 19 monitoring a set spring force of the spring 10, a lateral acceleration sensor 20 monitoring a lateral acceleration $Y_G$ of the vehicle body, and a longitudinal acceleration sensor 21 monitoring a longitudinal acceleration $X_G$ of the vehicle body. Since a magnitude of the lateral acceleration $Y_G$ is correlated with a degree of turn of the vehicle, the degree of turn is determined on the basis of the lateral acceleration $Y_G$. Furthermore, since a magnitude of the longitudinal acceleration $X_G$ is correlated to a magnitude of a braking force acting to the vehicle, the braking force is determined on the basis of the longitudinal acceleration $X_G$. The controller 18 is comprised of a control circuit for controlling the motor 17 employed in the fluid pressure control valve 6 on the basis of the input information from the sensors 19, 20 and 21.

Figure 2:
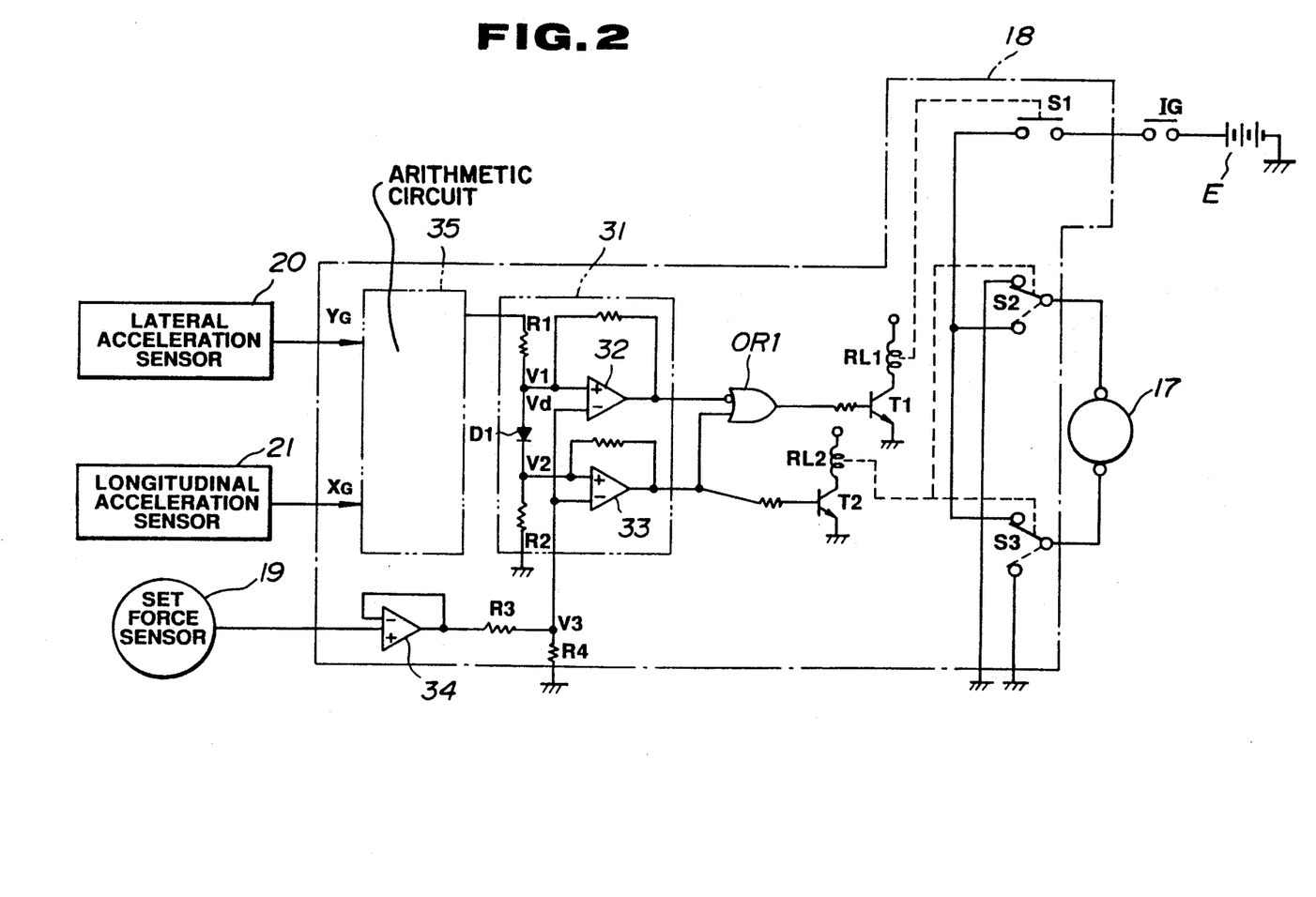
FIG. 2 is a circuit diagram illustrating a control circuit for activating a fluid pressure control valve disposed in the brake control system of FIG. 1 to control fluid pressures in rear wheel-cylinders.

Referring now to FIG. 2, one terminal of the motor 17 is connected through a switching section S2 of an electromagnetic relay, a switching section S1 of an electromagnetic relay and an ignition switch IG to a positive terminal of a car battery E, in that order. On the other hand, the other terminal of the motor 17 is connected through a switching section S3 of an electromagnetic relay, the switching section S1 and the ignition switch IG to the plus terminal of the car battery E, in that order. As appreciated from FIG. 2, both switching sections S2 and S3 are provided to switch the rotational direction of the motor. The switching section S1 is a normally open type switch which is closed only when an exciting coil RL1 is excited. The respective switching sections S2 and S3 are shifted from first positions indicated by solid lines to second positions indicated by broken lines so as to change a flow direction of current flowing through the motor and consequently to reverse the rotational direction of the motor only when an exciting coil RL2 is excited. One terminal of each exciting coil RL1 and RL2 is connected to the positive terminal of the battery E, whereas the other terminal of each exciting coil is grounded through a collector-emitter of each transistor T1 and T2. A base of the transistor T1 is connected to an output terminal of an OR gate OR1, while both a base of the transistor T2 and two input terminals of the OR gate are connected to a comparing circuit 31.

The comparing circuit 31 comprises two comparators 32 and 33, two resistances R1 and R2, and a diode D1. The resistances R1 and R2 are arranged in series with each other in a manner so as to sandwich the diode D1 between the resistances R1 and R2, as seen in FIG. 2. A line between the resistance R1 and the diode D1 is connected to the positive input terminal of the comparator 32, while a line between the resistance R2 and the diode D1 is connected to the positive input terminal of the comparator 33. The other end of the resistance R2 is grounded. Both negative input terminals of the comparators 32 and 33 are connected to an intermediate line between two resistances R3 and R4. The other end of the resistance R4 is grounded.

The resistance R3 is connected through an amplifier 34 to the set force sensor 19 to receive a voltage dependent on the magnitude of a current set force of the return spring 10. On the other hand, the resistance R1 receives an output voltage dependent on a desired target critical fluid pressure for the fluid pressure control valve 6 for the rear wheel-cylinders 4L and 4R. The output voltage is generated by an arithmetic circuit 35 which derives the target critical fluid pressure to be set in the fluid pressure control valve 6 on the basis of the signals from the lateral acceleration sensor 20 and the longitudinal acceleration sensor 21. The output voltage from the arithmetic circuit 35 is divided by the resistances R1 and R2 in such a manner as to apply two different voltages V1 and V2 to the respective positive input terminals of the comparators 32 and 33. The voltages V1 and V2 respectively correspond to upper and lower limits of a controllable voltage required to determine a desired set force of the return spring 10, necessary to set the desired target critical fluid pressure for the fluid pressure control valve 6. The voltage V2 impressed on the positive input terminal of the comparator 33 is set at a lower level than the voltage V1 impressed on the positive input terminal of the comparator 32 such that the voltage V2 is offset from the voltage V1 by a voltage difference $Vd$ corresponding to a hysteresis which is created by the diode D1 disposed between the resistances R1 and R2 so as to provide an acceptable voltage difference required for the comparison between the voltage V3 representative of the current critical fluid pressure actually monitored by the sensor 19 and the controllable voltage necessary to newly set the target critical fluid pressure. Thereafter, the voltages V1 and V2 are respectively compared with the voltage V3 by means of the comparators 32 and 33. The previously noted arithmetic circuit 35 basically derives the target critical fluid pressure $P_S$ to be set in the fluid pressure control valve 6 in accordance with a data map shown in FIG. 3 or an equation $P_S = P_{S1} + k_1 Y_G$, wherein $P_{S1}$ is a reference critical fluid pressure for the fluid pressure control valve 6, $k_1$ is a given gain (a given proportional constant) and $Y_G$ is the previously described lateral acceleration.

Figure 3:
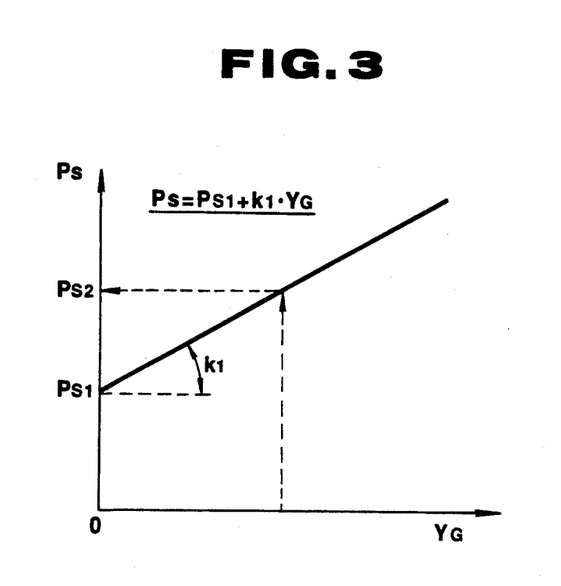
FIG. 3 is a graph illustrating control characteristics of a target critical fluid pressure set in the fluid pressure control valve.

As appreciated from FIG. 3, in the brake control system according to the invention, the critical fluid pressure $P_S$ is varied in response to various turning conditions of the vehicle. When the vehicle travels straight, that is, the lateral acceleration $Y_G$ is maintained 0, the target critical fluid pressure $P_S$ is set to the reference critical fluid pressure $P_{S1}$ and as a result the fluid pressure control characteristics of the valve 6 is varied in accordance with the solid line a-b-c (of FIG. 6) substantially asymptotic to the ideal brake fluid pressure distribution characteristic curve seen in FIG. 6. On the other hand, when the vehicle turns rightward or leftward, the target critical fluid pressure $P_S$ is varied in dependence on a degree of turn of the vehicle such that the target critical fluid pressure to the fluid pressure control valve acting for the rear wheels is increased in proportion to the degree of the vehicle turn. For example, during a right or left turn, the target critical fluid pressure $P_S$ to be set in the fluid pressure control valve 6 for the rear wheel-cylinders 4L and 4R is increased from the initial reference critical fluid pressure $P_{S1}$ to a greater target critical fluid pressure $P_{S2}$. That is, the brake fluid pressure distribution characteristics in front and rear wheel-cylinders is controlled to be varied in accordance with the characteristic curve a-d-e of FIG. 6 during a right or left turn.

Returning to FIG. 2, the comparing circuit 31, the OR gate OR1 and the transistors T1 and T2 operate as follows.

As set forth above, the arithmetic circuit 35 determines a target critical fluid pressure $P_S$ of the pressure control valve 6. For example, on turns, the target critical fluid pressure $P_S$ is set to a greater fluid pressure $P_{S2}$ than the reference critical fluid pressure $P_{S1}$ as seen in FIG. 3. In response to the greater fluid pressure $P_{S2}$ derived by the arithmetic circuit 35, voltages V1 and V2 are applied to the respective positive terminals of the comparators 32 and 33. The OR gate OR1 acts in conjunction with the comparators 32 and 33 to turn OFF the transistors T1 and T2 when the voltage V3 is equal to or less than the voltage V1 and is equal to or greater than the voltage V2, that is, $V2 \leq V3 \leq V1$, wherein the current critical fluid pressure is substantially equal to the target critical fluid pressure. Under this condition, since the current critical fluid pressure is essentially equivalent to the target critical fluid pressure, the turned-OFF transistor T1 acts to maintain the switching section S1 in its open state and the turned-OFF transistor T2 acts to maintain the switching sections S2 and S3 in the positions indicated by the solid lines of FIG. 2. As a result, the motor 17 is deactivated so as to retain the set force of the return spring 10 (consequently the critical fluid pressure or the split point) unchanged.

When the voltage V3 is less than the voltage V2 ($V3 < V2$), that is, the current critical fluid pressure is less than the target critical fluid pressure, the OR gate OR1 operates in conjunction with the comparators 32 and 33 to turn ON the transistors T1 and T2 such that the switching section S1 becomes kept in a closed state and the switching sections S2 and S3 are shifted to the positions indicated by the broken lines of FIG. 2. As a result, the motor 17 is driven in a normal rotational direction until the current critical fluid flow pressure is gradually increased and reaches the target critical fluid pressure while increasing the set force of the spring 10.

When the voltage V3 exceeds the voltage V1 ($V3 > V1$), that is, the current critical fluid pressure is greater than the target critical fluid pressure, the OR gate OR1 operates in conjunction with the comparators 32 and 33 to turn ON the transistor T1 and to turn OFF the transistor T2 such that the switching section S1 becomes kept in a closed state and the switching sections S2 and S3 are maintained in the positions indicated by the solid lines of FIG. 2. As a result, the motor 17 is driven in a reverse rotational direction until the current critical fluid flow pressure is gradually decreased and reaches the target critical fluid pressure while decreasing the set force of the spring 10.

As set forth above, the target critical fluid pressure $P_S$ is adjusted as seen in FIG. 3 such that the target critical fluid pressure $P_S$ is set to the reference critical fluid pressure $P_{S1}$ during a straight-ahead driving, and set to a higher fluid pressure $P_{S2}$ than the reference target critical pressure $P_{S1}$ in dependence on a degree of turn of the vehicle, determined by a magnitude of a lateral acceleration $Y_G$, during a left or right turn. In order to achieve the above noted critical fluid pressure control wherein both critical fluid pressures in rear-left and rear-right wheel-cylinders are controlled commonly and the critical fluid pressures in front and rear wheel-cylinders are controlled independently of each other, the brake fluid pressure distribution characteristics in front and rear wheel-cylinders are controlled as follows.

During a straight-ahead driving, the brake fluid pressure distribution characteristics with regard to front and rear brake fluid pressures is controlled to vary in accordance with the characteristic curve a-b-c indicated by the solid line of FIG. 6. Conversely, on turns, the brake fluid pressure distribution characteristics is controlled to vary in accordance with the characteristic curve a-d-e of FIG. 6.

According to the above described critical fluid pressure control achieved by the brake control system of the invention, the operation of the pressure control valve 6 is delayed because of the previously noted split point shifting from the split point b to the split point d during a vehicle turn. In a hard braking range wherein brake fluid pressures in wheel-cylinders become high, there is a tendency for a rear-wheel lock, i.e., rear-end skid rather than a front wheel lock. This reduces understeer of the vehicle occurring due to the front-end skid created by the front-wheel brake pressure $P_F$ set at a higher level than the rear-wheel brake fluid pressure $P_R$ during quick braking on turns. Therefore, the vehicle can safely travel along an acceptable turning locus during quick braking on turns.

In the aforementioned preferred embodiment, since the pressure-rise of the critical fluid pressure is controlled essentially in proportion to the magnitude of the lateral acceleration $Y_G$, as seen in FIG. 3, the critical fluid pressure can be suitably adjusted in response to the degree of turn of the vehicle, so as to assure an optimal turning locus for the vehicle. Unless it is necessary to execute the previously noted precise split-point control, a rough split-point control may be achieved in such a manner as to increase the split-point in a range above a given lateral acceleration.

The lateral acceleration $Y_G$ representing the degree of the vehicle turn may be replaced with a yaw rate of the vehicle, a steering angle, a wheel speed difference between right and left vehicle wheels, or the like.

Figure 4:
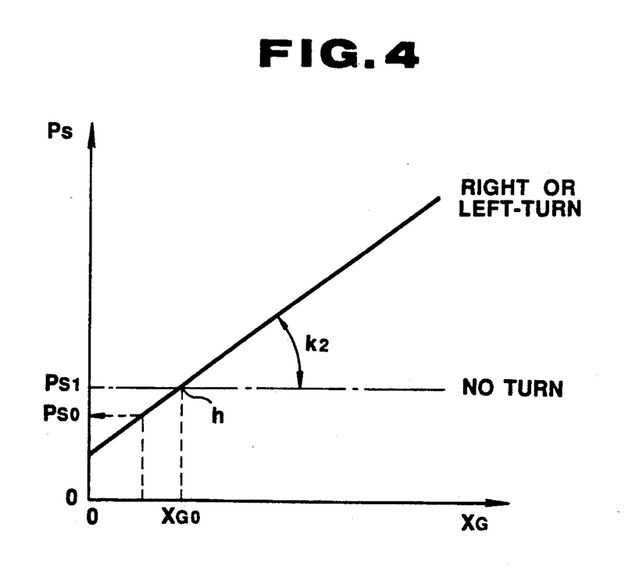
FIG. 4 is a graph illustrating a relationship between a longitudinal acceleration $X_G$ of a vehicle and a target critical fluid pressure $P_S$, wherein the target critical fluid pressure $P_S$ is varied in proportion to the longitudinal acceleration $X_G$ with a given proportional constant $k_2$.
Figure 5:
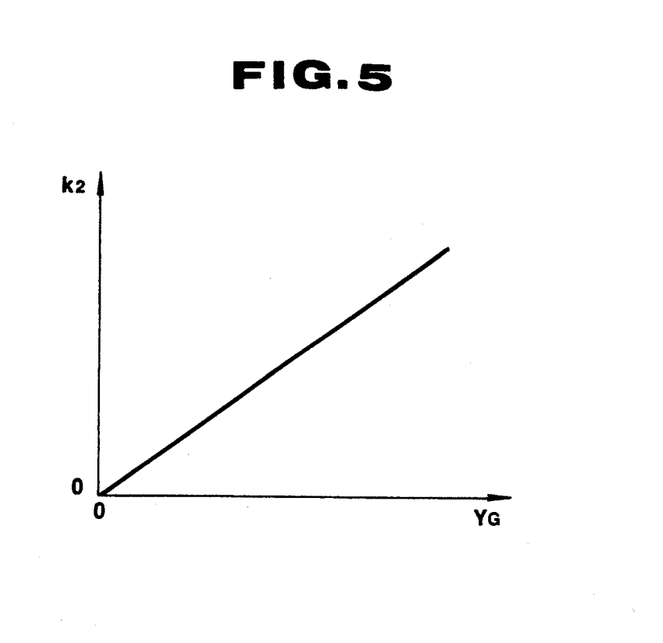
FIG. 5 is a graph illustrating a relationship between the proportional constant $k_2$ and a lateral acceleration $Y_G$ of the vehicle.

FIGS. 4 and 5 show a second embodiment of the critical fluid pressure control achieved by the brake control system according to the invention.

Although in the first embodiment the target critical fluid pressure $P_S$ is varied in dependence on the magnitude of the lateral acceleration $Y_G$ monitored by the sensor 20, i.e., the degree of turn of the vehicle, in the second embodiment the target critical fluid pressure $P_S$ may be varied in dependence on the magnitude of the longitudinal acceleration $X_G$ monitored by the sensor 21, i.e., the deceleration of the vehicle. According to the second embodiment, the target critical fluid pressure $P_S$ is varied in proportion to the longitudinal acceleration $X_G$ with a given gain $k_2$ (a given proportional constant) as seen in FIG. 4. That is, the target critical fluid pressure characteristics is indicated by a straight line penetrating a reference point h defined by a preset reference longitudinal acceleration $X_{GO}$ and a preset reference critical fluid pressure $P_{S1}$, with a given pressure gradient $k_2$ (a given gain or a proportional constant). As shown in FIG. 5, the pressure gradient $k_2$ is determined as a linear function of the lateral acceleration $Y_G$.

As appreciated from the above description of the second embodiment, the critical fluid pressure $P_S$ is set to the reference critical fluid pressure $P_{S1}$ during a straight-ahead driving, while the critical fluid pressure $P_S$ is increased or decreased in accordance with the straight line of FIG. 4 in response to the magnitude of the longitudinal acceleration $X_G$ on turns. Therefore, when the longitudinal acceleration $X_G$ becomes greater than or equal to the reference longitudinal acceleration $X_{GO}$, i.e., the deceleration is great, the critical fluid pressure $P_S$ is set to a higher pressure than the reference critical fluid pressure $P_{S1}$ and thus the brake fluid pressure distribution characteristics is controlled to vary substantially in accordance with the characteristic curve a-d-e of FIG. 6. On the other hand, when the longitudinal acceleration $X_G$ becomes less than the reference longitudinal acceleration $X_{GO}$, i.e., the deceleration is small, the critical fluid pressure $P_S$ is set to a lower pressure (as designated by $P_{S0}$ of FIG. 4) than the reference critical fluid pressure $P_{S1}$ and thus the brake fluid pressure distribution characteristics is controlled to vary substantially in accordance with the characteristic curve a-f-g of FIG. 6. As previously described, during moderate braking on turns, since neither front nor rear wheels reach a locking condition, cornering force created at the front wheels is increased, whereas cornering force created at the rear wheels is decreased due to the car weight shift towards the front, thereby resulting in oversteer tendencies during the above noted moderate braking action on a severe turn. In such a moderate braking action on turns, since the brake control system of the second embodiment operates to set the target critical fluid pressure $P_S$ at a lower pressure than the reference critical fluid pressure $P_{S1}$ as seen in the characteristic curve a-f-g of FIG. 6. This results in a tendency for a front-wheel lock, i.e., front-end skid rather than a rear-wheel lock during moderate braking on turns. The front-wheel lock compensates oversteer occurring due to the previously cornering force difference between the front and rear wheels, created by the car weight shift towards the front during moderate braking on turns.

Although the longitudinal acceleration sensor 21 detecting the longitudinal acceleration $X_G$ is used as a deceleration sensor, the longitudinal acceleration sensor is replaced with a sensor for monitoring an output brake fluid pressure from the master-cylinder 2 or a sensor for monitoring a depressing force of the brake-pedal.

As appreciated from the above, the brake control system according to the invention can eliminate understeer during quick braking on turns and in addition reduce oversteer during moderate braking on turns, so as to achieve an ideal neutral-steer. That is, on turns, since the brake control system according to the invention controls a critical fluid pressure, i.e., a split point to a brake fluid pressure control valve for commonly controlling brake fluid pressures in both rear-left and rear-right wheels in such a manner as to set the split point of the brake fluid control valve at a higher level than a reference split point corresponding to the reference critical fluid pressure, the brake control system of the invention can create a rear-end skid so as to eliminate understeer during quick braking on turns. Since a pressure-rise of critical fluid pressure in rear wheel-cylinders is suitably varied in dependence on the degree of turn, the brake control system of the invention can reliably reduce understeer occurring during quick braking on turns, irrespective of the degree of turn. Furthermore, the brake control system according to the second embodiment can control the split point or the critical fluid pressure to vary in dependence on a deceleration of the vehicle such that the critical fluid pressure is increased during quick braking on turns and decreased during moderate braking on turns, the brake control system can create a rear-end skid required to compensate understeer occurring during quick braking on turns and create a front-end skid required to compensate oversteer occurring during moderate braking on turns.

While the foregoing is a description of the preferred embodiments for carrying out the invention, it will be understood that the invention is not limited to the particular embodiment shown and described herein, but may include variations and modifications without departing from the scope or spirit of this invention as described by the following claims.

What is claimed is:

1. A control system for distributing braking forces applied to front and rear wheels in an automotive vehicle, comprising:
    a fluid pressure control valve for controlling brake fluid pressure distribution between said front and rear wheels, such that rear-wheel brake fluid pressure is reduced by a predetermined ratio when compared with front-wheel brake fluid pressure in a range above a critical fluid pressure at which said brake fluid pressure distribution between said front and rear wheels is essentially varied, while said rear-wheel brake fluid pressure is equivalent to said front-wheel brake fluid pressure in a range below said critical fluid pressure;
    means for monitoring whether said vehicle turns, to generate a signal representative of a turning state of said vehicle; and
    means for compensating steering characteristics of said vehicle toward neutral steering during braking on turns by varying said critical fluid pressure in response to said signal representative of a turning state of said vehicle, such that said critical fluid pressure is set at a higher level than a given reference critical fluid pressure, said reference fluid pressure being set in said fluid pressure control valve in a straight-ahead driving state of said vehicle.

2. The control system as set forth in claim 1, wherein said monitoring means includes means for detecting a degree of turn of said vehicle, said means for compensating varying said critical fluid pressure in dependence on said degree of turn detected by said detecting means.

3. The control system as set forth in claim 2, wherein said detecting means includes a lateral acceleration sensor for monitoring lateral acceleration of said vehicle to generate a signal representative of said lateral acceleration, said detecting means determining said degree of turn on the basis of said signal from said lateral acceleration sensor.

4. The control system as set forth in claim 3, wherein said means for compensating varies said critical fluid pressure linearly such that said critical fluid pressure rises in proportion to said degree of turn.

5. A control system for distributing braking forces applied to front and rear wheels in an automotive vehicle, comprising:
    a fluid pressure control valve for controlling brake fluid pressure distribution between said front and rear wheels, such that rear-wheel brake fluid pressure is reduced by a predetermined ratio when compared with front-wheel brake fluid pressure in a range above a critical fluid pressure at which said brake fluid pressure distribution between said front and rear wheels is essentially varied, while said rear-wheel brake fluid pressure is equivalent to said front-wheel fluid pressure in a range below said critical fluid pressure;
    means for monitoring whether said vehicle turns, to generate a signal representative of a turning state of said vehicle;
    means for deriving a magnitude of braking force of said vehicle to generate a signal representative of said magnitude of braking force; and
    means for compensating steering characteristics of said vehicle towards neutral steering during braking on turns, by varying said critical fluid pressure in response to said signal representative of a turning state of said vehicle, such that said critical fluid pressure is set at a higher level than a given reference critical fluid pressure set in said fluid pressure control valve in a straight-ahead driving state of said vehicle when said signal representative of said magnitude of braking force is above a predetermined threshold, while said critical fluid pressure is set at a lower level than said reference critical fluid pressure when said signal representative of braking force is less than said predetermined threshold.

6. The control system as set forth in claim 5, wherein said means for compensating varies said critical fluid pressure linearly in proportion to said magnitude of braking force.

7. The control system as set forth in claim 5, wherein said means for deriving said magnitude of braking force includes a longitudinal acceleration sensor for monitoring longitudinal acceleration of said vehicle to generate a signal representative of said longitudinal acceleration, said deriving means determining said magnitude of braking force on the basis of said signal from said longitudinal acceleration sensor.

8. A control system for distributing braking forces applied to front and rear wheels in an automotive vehicle, comprising:
    a fluid pressure control valve for controlling brake fluid pressure distribution between said front and rear wheels, such that rear-wheel brake fluid pressure is reduced by a predetermined ratio when compared with front-wheel brake fluid pressure in a range above a critical fluid pressure at which said brake fluid pressure distribution between said front and rear wheels is essentially varied, while said rear-wheel brake fluid pressure is equivalent to said front-wheel fluid pressure in a range below said critical fluid pressure;
    means for detecting a degree of turn of said vehicle;
    means for deriving a magnitude of braking force of said vehicle to generate a signal representative of said magnitude of braking force;
    means for compensating steering characteristics of said vehicle toward neutral steering during braking on turns, by varying said critical fluid pressure in accordance with said degree of turn, such that said critical fluid pressure is set at a higher level than a given reference critical fluid pressure with a given positive pressure gradient proportional to said degree of turn so as to eliminate understeering tendencies occurring due to hard braking on turns when said signal representative of said magnitude of braking force is above a predetermined threshold, while said critical fluid pressure is set at a lower level than said reference critical pressure with a given negative pressure gradient proportional to said degree of turn so as to eliminate oversteering tendencies occurring due to light braking on turns when said signal representative of said magnitude of braking force is less than said predetermined threshold, said reference critical fluid pressure being set in said fluid pressure control valve in a straight-ahead driving state of said vehicle.

* * * * *